Oct. 8, 1968     K. V. KORDESCH ET AL     3,405,010
SPINEL-RUTHENIUM CATALYZED ELECTRODE
Filed July 18, 1963
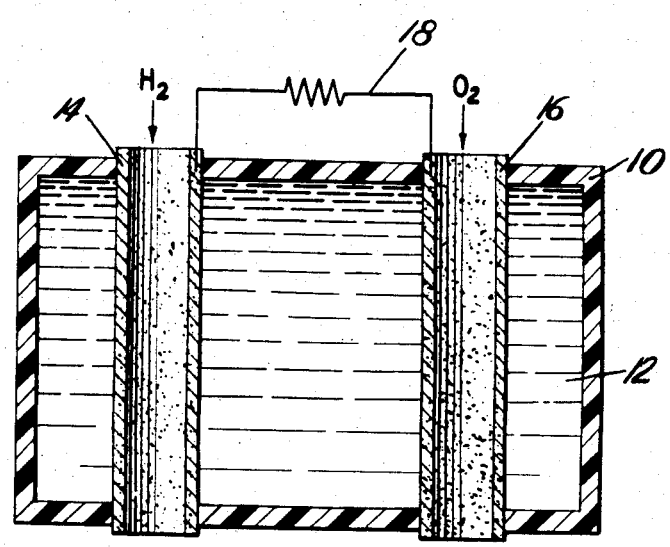
INVENTORS
KARL V. KORDESCH
MARVIN L. KRONENBERG
BY
ATTORNEY 3,405,010
SPINEL-RUTHENIUM CATALYZED ELECTRODE
Karl V. Kordesch, Lakewood, and Marvin L. Kronenberg, Cleveland, Ohio, assignors to Union Carbide Corporation, a corporation of New York
Filed July 18, 1963, Ser. No. 295,878
9 Claims. (Cl. 136—120)

This invention relates generally to catalyzed electrodes and, more particularly, to an improved catalyzed electrode suitable for use in fuel cells.

A fuel cell may be considered as a primary galvanic cell, the basic reaction of which is the electrochemical oxidation of a fuel. Fuel cells, however, differ from ordinary primary cells, such as the La Clanche dry cell, in that the fuel and oxidant are generally introduced continuously into the cell electrodes during production of electricity. In fuel cells, the electrodes and the electrolyte should, in theory at least, maintain a constant value while the fuel and oxidant react electrochemically, and the electricity and product of reaction are removed from the cell.

Although fuel cells have been known for over a century, many scientists are still actively engaged in finding new ways to boost the electrical output of these cells in order to render them commercially feasible. One such area of research involves catalysis of the reactions which take place at the cell electrodes. New methods of depositing known catalysts in a more active form and various new catalysts are continually being developed. However, there is still a need for catalysts which will raise the current density and/or the voltage of the cell to levels approaching the theoretical maxima.

It is, therefore, the main object of the present invention to provide an improved catalyzed electrode suitable for use in fuel cells.

It is another object of the invention to provide an improved catalyzed electrode suitable for use as the cathode in a hydrogen-oxidant fuel cell.

A further object is to provide such an electrode which contains an improved peroxide-decomposing catalyst.

A still further object is to provide such an electrode wherein the catalyst is insoluble.

Other aims and advantages of the invention will be apparent from the following description and appended claims.

In the drawing, the single figure is a vertical section of a typical hydrogen-oxygen fuel cell embodying the present invention.

In accordance with this invention, there is provided a method for catalyzing an electrode, which method comprises applying to the electrode a catalyzing solution of a heavy metal salt, an aluminum salt, and a ruthenium salt; and then heating the electrode to a temperature in the range of about 700° C. to about 900° C. to deposit the heavy metal, aluminum, and ruthenium on the electrode. The resulting article is a porous electrode having deposited thereon a catalyst comprising in combination the pyrolysis product of a heavy metal salt, an aluminum salt, and a ruthenium salt.

In applicants' copending United States patent application bearing Ser. No. 213,246, entitled, "Hydrogen Anode for a Fuel Cell," filed July 30, 1962, now U.S. 3,307,977, there is described a method for catalyzing an electrode by coating it with a solution of a heavy metal salt and an aluminum salt, heating it to at least 700° C. to deposit a spinel thereon, coating it with a second solution of a transition metal of Group VIII of the Periodic Table, and then heating it to a temperature up to 200° C. In that process, it is essential that the transition metal catalyst be deposited at a temperature below 200° C. in order to avoid a reduction in the activity of the metal catalyst. In fact, it is generally assumed that the activity of any noble metal catalyst is lost when it is heated to temperatures of 300° C. to 400° C. and this is actually true with most of the noble metals. However, when the noble metal catalyst is deposited at temperatures below 300° C., it does not remain insoluble and often appears in the electrolyte during operation of the cell. Of course, this decreases the life of the cell.

The present invention stems from the unexpected discovery that when a ruthenium salt is added to a catalyzing solution of a heavy metal salt and an aluminum salt, the resulting solution can be applied to an electrode and heated to temperatures in the range of 700° C. to 900° C. without reducing the activity of the deposited ruthenium. Moreover, the deposited catalyst is insoluble and, therefore, does not dissolve in the electrolyte. This not only prevents the loss of catalyst from the catalyzed electrode, but the absence of soluble ruthenium and other metals on the cathode also prevents the plating of such metals on the anode. Further, electrodes catalyzed by this invention have been found to have a significantly increased current-carrying ability compared with most prior art electrodes. The ruthenium is also a very efficient peroxide-decomposing catalyst, which makes the electrodes of this invention especially useful as cathodes in hydrogen-oxidant fuel cells.

The heavy metal salt employed in the catalyzing solution is a salt of at least one metal selected from the group consisting of iron, cobalt, nickel, manganese, chromium, copper, silver, gold, platinum, vanadium, titanium, uranium, thorium, and the rare earths. Cobalt salts are preferred because the cobalt-aluminum spinel has been found to provide the best catalyst for most fuel cell reactions.

The types of salts used in the catalyzing solution are not critical, but they should be easily decomposable or reducible at temperatures of 700° C. to 900° C. The heavy metal and aluminum salts are preferably nitrates or nitrites, although other salts such as those of chloric acid, chromic acid, oxalic acid, acetic acid, and formic acid are also suitable. The preferred ruthenium salt is ruthenium trichloride, but ruthenium nitrosohydroxide and ruthenium nitrate are also suitable.

The liquid solvent for the catalyzing solution may be water or any other suitable solvent which does not have any deleterious effect on the particular electrode and catalysts employed. Of course, the salts employed must be soluble in the chosen solvent. The concentrations of the various salts in the catalyzing solution depend mainly on the catalyst concentrations desired in the final electrode, as described below. The solution preferably contains approximately stoichiometric amounts of the heavy metal and aluminum salts so that the pyrolysis product produced by the heating step is a true spinel structure.

Porous electrodes suitable for use in fuel cells are well known in the art, and the inventive method is applicable to electrodes made of carbon, metal, or any other suitable conductive material. The catalyzing solution is applied to the electrode by any suitable method, such as by impregnating the electrode with the solution. The electrode is then heated to a temperature in the range of about 700° C. to about 900° C. to decompose or reduce the salts and deposit the heavy metal, aluminum, and ruthenium on the electrode. The heating step also removes the liquid solvent and any volatile reaction products from the electrode. The heating step may be carried out by any suitable heating means, such as by placing the electrode in an oven for about 2 to 24 hours. Although the exact nature of the resulting pyrolysis product deposited on the electrode is not completely understood, it is believed that the heavy metal and aluminum form a heavy metal-aluminum spinel and that the ruthenium is built into the lattice of the spinel.

The exact catalyst concentration desired in the final electrode depends somewhat on the particular application intended for the electrode. In most cases, the concentration of the heavy metal-aluminum spinel is preferably in the range of about 0.05 to about 0.2 weight percent based on the weight of the electrode material, while the concentration of the ruthenium is preferably within the range of about 0.25 to about 8.0 milligrams of ruthenium per square centimeter of electrode surface area. Concentrations of about 0.1 weight percent spinel and about 2 mg./cm.$^2$ ruthenium are generally the most active.

The thermal deposition step in the subject method may be carried out either in an oxidizing atmosphere, such as steam or carbon dioxide, or in a reducing atmosphere, such as hydrogen. The presence of the ruthenium has been found to produce deeper activation of the electrode, and also improves the electrolyte repellency of the electrode. In fact, the electrolyte repellency of the electrodes is improved to such a degree that the amount of wetproofing agent added can be decreased to one third the amount required in prior art electrodes, and in some applications the wetproofing can be eliminated altogether.

A preferred embodiment of a hydrogen-oxidant fuel cell employing electrodes prepared in accordance with the invention is shown in the drawing. This fuel cell comprises a container 10 filled with an electrolyte 12, and a hydrogen anode 14 and an oxygen cathode 16 in contact with the electrolyte. The electrolyte 12 is suitably composed of a 12 to 15 M solution of potassium hydroxide. The electrodes are tubular in shape and are suitably made of activated carbon, i.e., carbon having a high surface area. In operation, hydrogen gas is passed through the anode 14, oxygen gas is passed through the cathode 16, and the generated electrical current is passed through an external load circuit 18 electrically connected to the anode 14 and cathode 16.

In one example of the invention, a 0.25-inch thick carbon plate electrode to be used as the cathode in a conventional hydrogen-oxidant fufel cell was impregnated with a catalyzing solution made by combining equal parts by volume of a 0.01 N solution of ruthenium chloride (RuCl$_3$), a 0.2 N solution of aluminum nitrate, and a 0.1 N solution of cobalt nitrate. The impregnated electrode was then heated to a temperature of about 800° C. in a steam atmosphere, maintained at that temperature for about 25 minutes, and then cooled to room temperature. The catalyst concentration in the resulting electrode was about 0.1 weight percent aluminum-cobalt spinel and about 0.5 mg./cm.$^2$ ruthenium. After the electrode had been catalyzed, it was wetproofed by standard techniques (wetproofing solution of 3 weight percent paraffin in petroleum ether).

When used as the cathode in a hydrogen-oxidant fuel cell, the catalyzed electrode operated for 6,000 hours at a current density of 50 amps/square foot. Similar electrodes catalyzed with only the aluminum-cobalt spinel could be operated for only 2,000 hours in the same cell at the same current density. The inventive electrode was also capable of carrying currents of 300 amps/square foot at 0.85 volt, compared with 100 amps/square foot for the other electrodes. The short circuit current of the inventive electrode was above 2,000 amps/square foot.

In another example of the invention, a 0.25-inch thick carbon plate electrode to be used as the cathode in a conventional hydrogen-oxygen fuel cell was impregnated with an aqueous acidic chloride solution as described in the example above and containing 20 mg./ml. Ru$^{+3}$. The impregnated electrode was then heated at 700° C. in a hydrogen atmosphere for three hours and then cooled to room temperature. The resulting catalyzed electrode contained ruthenium in a concentration of about 1.5 mg./cm.$^2$ of apparent electrode surface area. After the electrode had been catalyzed, it was wetproofed by standard techniques using a wetproofing solution of 3 weight percent paraffin wax in petroleum ether.

The final catalyzed and wetproofed electrode was placed in a conventional hydrogen-oxidant fuel cell and operated continuously at 100 amps/ft.$^2$ and 50° C. The initial cathode-to-reference potential (Hg/HgO reference electrode) was −0.028 volt. The electrode improved in performance for the next 350 hours, while under continuous 100 amps/ft.$^2$ drain, to an electrode reference potential of 0.012 volt. The electrode life was determined as about 4,400 hours with a continuous drain of 100 amps/ft.$^2$.

When the catalyst was applied to the electrode according to previously practiced procedures (heating in an oven to 150° C. to 200° C. in air), the potential under load was −0.048 volt initially and recovered to −0.042 volt after 75 hours. The polarization thereafter increased at a rate of 250 $\mu$v./hour. Thus, the electrode life in terms of total deterioration under load was only 475 hours. Accordingly, it can be seen that the performance of the electrodes prepared by the method of this invention is substantially superior to that exhibited by electrodes prepared by prior art techniques.

While various specific forms of the present invention have been illustrated and described herein in some detail, it will be apparent that the same are susceptible of numerous modifications within the scope of the invention. For example, although the invention has been described with particular reference to the use of the catalyzed electrodes as oxygen cathodes, the inventive electrodes are also useful as very repellent base materials for anodes, in which case an additional anode catalyst would be applied.

What is claimed is:

1. A method for catalyzing a porous electrode, which method comprises applying to said electrode a catalyzing solution of a heavy metal salt, an aluminum salt, and a ruthenium salt; and then heating the electrode to a temperature in the range of about 700° C. to about 900° C. to deposit said heavy metal, aluminum, and ruthenium from said salts on said electrode.

2. The method of claim 1 wherein said heavy metal salt is a salt of at least one metal selected from the group consisting of iron, cobalt, nickel, manganese, chromium, copper, silver, gold, platinum, vanadium, titanium, uranium, thorium, and the rare earths.

3. The method of claim 1 wherein said heavy metal salt is cobalt nitrate, said aluminum salt is aluminum nitrate, and said ruthenium salt is ruthenium nitrate.

4. The method of claim 1 wherein said heating step deposits a heavy metal-aluminum spinel and ruthenium on said electrode.

5. The method of claim 1 wherein said porous electrode comprises activated carbon.

6. The method of claim 1 wherein said heating step is carried out in an oxidizing atmosphere.

7. The method of claim 1 wherein said heating step is carried out in a reducing atmosphere.

8. Electrodes produced by the process of claim 1.

9. Electrodes produced by the process of claim 5.

References Cited

UNITED STATES PATENTS 2,669,598  2/1954  Marko et al. _____ 136—122

FOREIGN PATENTS 233,847  5/1961  Australia.

WINSTON A. DOUGLAS, *Primary Examiner.*

O. F. CRUTCHFIELD, *Assistant Examiner.*